(12) United States Patent
Rieder et al.

(10) Patent No.: US 11,417,968 B2
(45) Date of Patent: Aug. 16, 2022

(54) PLUGGABLE MODULE CONNECTOR AND METHOD FOR ELECTRICALLY CONDUCTIVELY CONNECTING AT LEAST TWO BATTERY MODULES

(71) Applicant: Lisa Dräxlmaier GmbH, Vilsbiburg (DE)

(72) Inventors: Stefan Rieder, Nandlstadt (DE); Robert Saller, Egglkofen (DE); Annika Krebs, Ergolding (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 65 days.

(21) Appl. No.: 17/254,355

(22) PCT Filed: Apr. 29, 2019

(86) PCT No.: PCT/EP2019/060901
§ 371 (c)(1),
(2) Date: Dec. 21, 2020

(87) PCT Pub. No.: WO2019/242917
PCT Pub. Date: Dec. 26, 2019

(65) Prior Publication Data
US 2021/0265750 A1 Aug. 26, 2021

(30) Foreign Application Priority Data
Jun. 20, 2018 (DE) .......................... 102018114764.3

(51) Int. Cl.
*H01R 12/00* (2006.01)
*H01R 4/50* (2006.01)
(Continued)

(52) U.S. Cl.
CPC ........ *H01R 4/5066* (2013.01); *H01M 50/505* (2021.01); *H01M 50/526* (2021.01); *H01R 25/145* (2013.01); *H01R 43/027* (2013.01)

(58) Field of Classification Search
CPC .............. H01R 2201/26; H01R 23/725; H01R 9/2458; H01R 31/00
See application file for complete search history.

(56) References Cited

U.S. PATENT DOCUMENTS

| 8,765,289 B2 * | 7/2014 | Ikeda .................. H01M 50/572 439/756 |
| 2009/0269985 A1 * | 10/2009 | Stadler ................... H01R 43/16 439/889 |

(Continued)

FOREIGN PATENT DOCUMENTS

| DE | 102009024514 A1 | 12/2010 |
| DE | 102009058723 A1 | 6/2011 |

(Continued)

OTHER PUBLICATIONS

Translation of Office Action for DE 102018114764.3 from the German Patent and Trademark Office dated Mar. 11, 2019.

(Continued)

*Primary Examiner* — Phuong Chi Thi Nguyen
(74) *Attorney, Agent, or Firm* — Jacob Eisenberg

(57) ABSTRACT

The present disclosure relates to a plug-in module connector or the electrically conductive connection of at least two battery modules, including a flexible busbar for the electrically conductive connection of respective poles of the battery modules, the busbar enabling tolerance compensation with respect to the poles in the transverse direction of the module connector; two retaining clamps for gripping the busbar and one of the respective poles of the battery modules, the retaining clamps enabling tolerance compensation with respect to the poles in the longitudinal direction and (Continued)

vertical direction of the module connector; an insulation housing in which the retaining clamps plugged onto the busbar can be received. Furthermore, the present disclosure also concerns a method for the electrically conductive connection of at least two battery modules by means of a plug-in module connector.

11 Claims, 5 Drawing Sheets

(51) Int. Cl.
*H01M 50/505* (2021.01)
*H01M 50/526* (2021.01)
*H01R 25/14* (2006.01)
*H01R 43/027* (2006.01)

(56) References Cited

U.S. PATENT DOCUMENTS

| | | | |
|---|---|---|---|
| 2011/0177372 A1* | 7/2011 | Maguire | H01M 10/14 429/99 |
| 2012/0088143 A1 | 4/2012 | Lietz et al. | |
| 2014/0235115 A1 | 8/2014 | Grzywok | |
| 2014/0287622 A1* | 9/2014 | Kinoshita | H01M 50/543 439/595 |
| 2015/0136476 A1* | 5/2015 | Lumetta | H01R 12/57 174/70 B |
| 2019/0267600 A1* | 8/2019 | Robert | H01M 50/502 |

FOREIGN PATENT DOCUMENTS

| | | |
|---|---|---|
| DE | 102012209856 A1 | 12/2013 |
| DE | 102012223561 A1 | 6/2014 |
| DE | 10 2013 202 513 A1 | 8/2014 |
| DE | 102014226187 A1 | 6/2016 |
| JP | 2008034318 A | 2/2014 |

OTHER PUBLICATIONS

Office Action from the German Patent Office for DE 102018114764. 3, dated Mar. 11, 2019, in the German language.
International Search Report for PCT/EP2019/060901, dated Jul. 24, 2019, in the German language.
WIPO translation of the International Search Report for PCT/EP2019/060901, dated Jul. 24, 2019, from the German to the English language.
Decision to Grant DE 102018114764.3 by the German Patent Office dated Nov. 13, 2019.
Granted German priority patent DE 102018114764 B4, dated Feb. 20, 2020.
English language abstract for DE 102009058723 (A1) from the EPO.
English language abstract for DE 102012223561A1 from the EPO.
English language abstract for DE 102012209856 (A1) from the EPO.
English language abstract for DE 102014226167A1 from the EPO.
Machine translation into English for JP ,2008-034318,A.

* cited by examiner

PLUGGABLE MODULE CONNECTOR AND METHOD FOR ELECTRICALLY CONDUCTIVELY CONNECTING AT LEAST TWO BATTERY MODULES

CROSS REFERENCE TO RELATED APPLICATIONS

This application is a national phase application of International Application No. PCT/EP2019/060901, filed on Apr. 29, 2019, and claims the priority benefit of German Application 10 2018 114 764.3, filed on Jun. 20, 2018, the content of both of which is incorporated herein by reference.

BACKGROUND OF THE INVENTION

The present disclosure relates to a plug-in module connector and a method for electrically connecting at least two battery modules. Furthermore, the disclosure also relates to a connection system for the electrically conductive connection of at least two battery modules, including a plug-in module connector and at least two contact protection caps for poles of the battery modules.

Particularly in high-voltage storage systems for motor vehicles, several battery cells are often combined and connected to individual battery modules. These types of battery modules then have to be connected to each other electrically and conductively, i.e., to be contacted with one another. Generally, busbars are used for this purpose, by means of which the respective battery modules are contacted and connected to each other by means of screw connections. However, such an approach requires a relatively high amount of assembly time. In addition, it is necessary, among other things, that tolerance compensation be ensured for when connecting such battery modules due to manufacturing tolerances is desired.

BRIEF SUMMARY OF THE INVENTION

It is an object of the present disclosure to provide a solution by means of which, on the one hand, battery modules can be connected to each other particularly simply and electrically and, on the other hand, tolerance compensation can be ensured when the battery modules are connected.

This and other objects of the present disclosure are solved by means of a plug-in module connector as well as by means of an electrically conductive connection of at least two battery modules with the characteristics of the independent claims. Advantageous designs with appropriate and non-trivial developments of the disclosure are further set out in the dependent claims.

The plug-in module connector for the electrically conductive connection of at least two battery modules, according to the invention, comprises a flexible busbar for the electrically conductive connection of respective poles of the battery modules, wherein the busbar enables a tolerance balance with respect to the poles in the transverse direction of the module connector. In addition, the plug-in module connector includes two clamps for embracing the busbar and one of the respective poles of the battery modules, whereby the clamps allow for tolerance compensation with respect to the poles in the longitudinal and vertical direction of the module connector. Furthermore, the plug-in module connector includes an insulation housing in which the retaining clamps attached to the busbar can be accommodated.

The flexible busbar may not only be made of, for example, copper, but also from other well-conducting materials as well. With the busbar being flexible, especially in the transverse direction of the module connector, the busbar can compensate for tolerances in the transverse direction of the plug-in module connector with respect to the poles of the battery modules to be connected to one another. When connecting two battery modules in an electrically conductive manner, it can happen that the poles connected to each other are arranged slightly differently in the transverse direction of the module connector due to manufacturing tolerances. The flexible busbar makes it particularly simple to provide tolerance compensation in this regard.

The two clamps can be U-shaped, for example, so that they can be easily plugged into the poles of the battery modules via the busbar as well as when the module connector is plugged in. Due to the shape of the retaining clamps, a tolerance compensation in the vertical direction and in the longitudinal direction of the plug-in module connector is possible for the electrically conductive connection of at least two battery modules. For example, poles that are positioned differently in the longitudinal direction to each other can be easily connected by means of the same plug-in module connector, because a tolerance compensation in the longitudinal and vertical direction is given by the two retaining clamps.

In addition, it is also possible for the insulation housing to accommodate movement or displacement of the flexible busbar in the transverse direction of the plug-in module connector. The insulation housing can be, for example, an injection-molded part that can be produced in large quantities and at particularly low cost. The retaining clamps themselves preferably have a spring effect, so that between them the electric busbar can be reliably received and fixed as well as can the poles of the respective battery modules.

Between the flexible busbar and the poles, full-surface contact can be made. Depending on the distance between the poles in the longitudinal direction, the poles can lie against the flexible busbar at different positions relative to the longitudinal direction, thus allowing for a tolerance compensation in the longitudinal direction of the plug-in module connector. The retaining clamps, which preferably form retaining springs, can be mounted differently in the vertical direction depending on the relative position of the poles to each other so as to compensate for tolerance in the high direction of the plug-in module connector. The flexible busbar and the respective poles of the battery modules are pressed together over their entire surface by the retaining springs.

Thanks to the flexible and plug-in module connector, an assembly time for the electrically conductive connection of at least two battery modules can be considerably reduced, as the plug-in module connector simply has to be plugged onto the poles of the battery modules. In addition, the plug-in module connector makes it possible to compensate for tolerances of several millimeters on the poles of the battery modules serving as module connections in individual spatial directions. By means of such plug-in module connectors, it is possible, for example, to connect a large number of battery modules with each other in a very short time and to compensate for tolerances in all three spatial directions with regard to the relative positioning of the poles of the respective battery modules to be connected with each other. In addition to facilitating battery assembly, the plug-in module connector also makes it possible to increase the added value for a battery manufacturer.

An advantageous embodiment of the present disclosure is that the insulation housing has at least one opening for the insertion of a tool by means of which the retaining clamps can be expanded. This makes it easy to attach the plug-in module connector to the respective poles of the battery modules to be connected with each other, either powerlessly or without effort, for example by means of a robot. Through the opening in the insulation housing, the tool can be inserted to expand the respective retaining clamps. Plugging the module connector onto the poles of the battery modules to be contacted ensures that no or almost no force is applied to the poles. When connecting the module connector to the poles of the battery modules to be contacted with one another, it is possible to ensure that no or virtually no force is exerted on the poles.

Another advantage of the present disclosure is that the flexible busbar comprises several sheets of metal layered on top of one another. For example, the flexible busbar can be made of several copper sheets or copper foils with a material thickness of 0.2 millimeters. The fact that the flexible busbar comprises several sheets layered on top of one another allows the individual sheets to slide against each other, making it particularly easy to bend or deform the busbar in the transverse direction of the module connector, so that relatively small forces act on the respective poles of the battery modules when compensating for tolerances in the transverse direction of the module connector.

According to further advantages set out in the present disclosure, it is intended that the plates are pressure welded at respective longitudinal ends of the busbar and thus form solid connection areas. At those points where the contact is made between the flexible busbar and the respective poles of the battery modules, there are thus massive connection areas. This results in particularly good current-conducting capabilities, especially with regard to the respective resistance and current-carrying cross sections.

In a further advantageous embodiment of the present disclosure, it is provided that the insulation housing has at least one latching element for forming a latching connection with the busbar. This allows the busbar to be easily and reliably arranged and pre-assembled within the insulation housing.

A further advantageous embodiment of the present disclosure entails the insulation housing being at least one latching element for forming a latching connection with respective retaining clamps. This makes it easy and reliable to pre-assemble and fix the respective retaining clamps within the insulation housing.

The connection system according to the disclosure for the electrically conductive connection of at least two battery modules comprises the plug-in module connector according to the invention or an advantageous design of the plug-in module connector as well as at least two contact protection caps for the respective poles of the battery modules. When mounting or connecting the battery modules by means of the plug-in module connector, the contact protection caps can release the respective poles of the battery modules. Before connecting or mounting the battery modules in an electrically conductive manner, the contact protection caps can ensure that the poles of the battery modules are protected by turning the contact protection caps around respective poles of the battery modules.

Another advantageous design of the connection system is that the protection caps on the battery modules can are movable between a release position releasing the poles and a protective position surrounding the poles. This allows the contact protection caps to be easily moved into the release position if required, so that the poles can be connected to each other in an electrically conductive manner using the plug-in module connector. As long as the battery modules are not yet electrically connected to each other by means of the plug-in module connector, the contact protection caps can be arranged in their protective position surrounding the respective poles.

According to a further advantageous design of the connection system, it is provided that the contact protection caps each have at least one spring element by means of which the contact protection caps lock in their protective position on a housing part of the battery modules. In this way, it can be reliably ensured that the contact protection caps cannot be moved away from their protective positions without the effect of application of force to the spring elements.

An additional advantageous design of the connection system is that the insulation housing of the plug-in module connector has one receiver per contact protection cap by means of which the respective contact protection cap can be moved from the release position into the protection position when the module connector is removed from the poles against a plug-in direction after being plugged onto them. This automatically ensures that as soon as the module connector is again removed from the poles, it is surrounded by the contact protection caps. The contact protection caps can be made of polyamide, for example, and are held in their upper end position, which corresponds to the protective position, by the spring elements. When the module connector is pushed on or plugged on, the contact protection caps are pressed down by overcoming a respective spring force of the spring elements. In a lower end position, which corresponds to the release position, the drivers of the insulation housing can pull or move the contact protection caps back up into their protective position when the module connector is removed. Preferably, the insulation housing is provided with a respective release for each driver, so that the module connector can be easily released from the protective caps after removing it from the poles.

In the inventive method for the electrically conductive connection of at least two battery modules by means of the inventive plug-in module connector or an advantageous version of the plug-in module connector, the module connector is first pre-assembled by arranging the holding clamps of the module connector, which are placed on the busbar of the module connector, in the insulation housing of the module connector, after which the pre-assembled module connector for the electrically conductive connection of the battery modules is plugged in the respective poles of the battery modules. Advantageous designs of the plug-in module connector and/or the connection system are to be regarded as advantageous configurations of the method according to the present disclosure, whereby the plug-in module connector and/or the connection system have means for carrying out the method steps.

Further advantages features and details of the invention arise from the subsequent description of a preferred embodiment as well as from the drawings. The features and combinations of features mentioned above in the description, as well as the features and combinations of features shown in the description of the figure and/or in the figures alone are usable not only in the combination indicated in each case, but also in other combinations or on their own without leaving the scope of the invention.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

In the following, advantageous examples of the invention are set out with reference to the accompanying drawings, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

In the figures, the same or functionally identical elements have been provided with the same reference signs.

Figure 1:
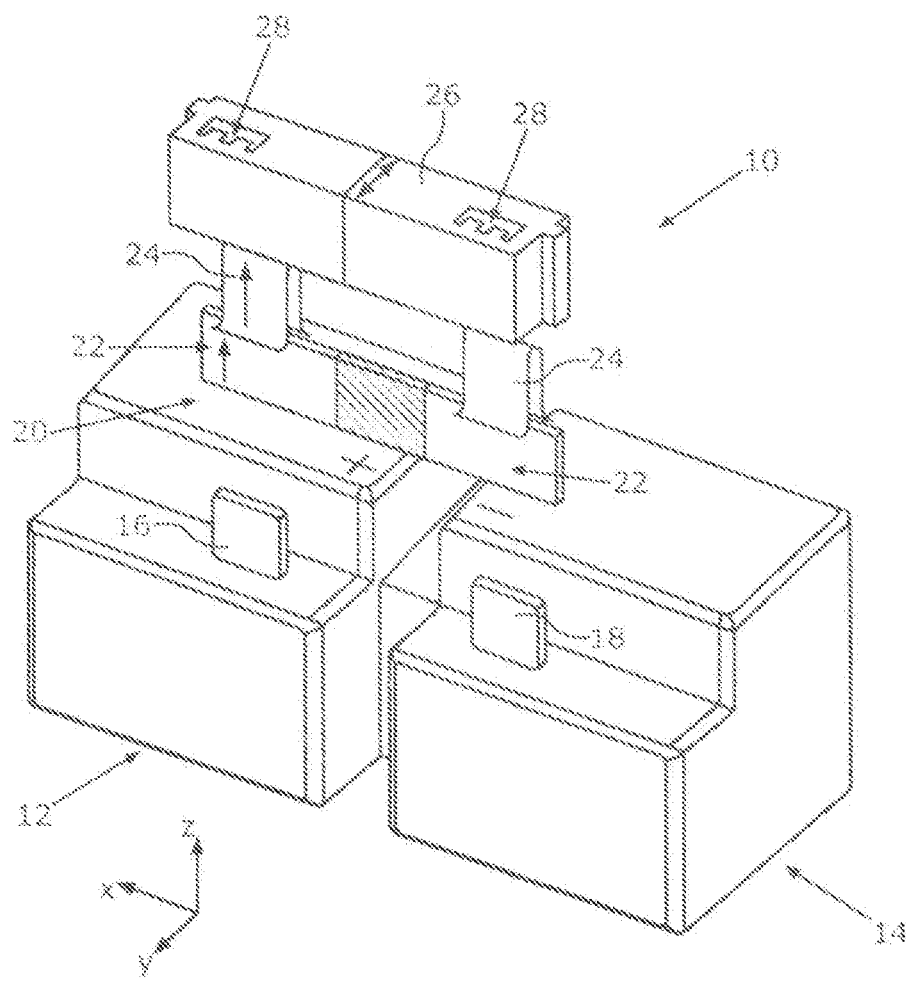
FIG. 1 depicts a perspective view of a plug-in module connector for the electrically conductive connection of two battery modules, whereby the plug-in module connector is shown in an exploded view.

A plug-in module connector 10 for an electrically conductive connection of two battery modules 12,14 is shown in an exploded view in FIG. 1. Battery modules 12 and 14 may, for example, be battery modules for a high-voltage battery or a high-voltage accumulator of an electrically powered motor vehicle. Within the battery modules 12 and 14, several battery cells not shown here in detail are combined and interconnected with one another.

During installation of the high-voltage storage tank or the high-voltage batteries, the individual modules 12 and 14 must again be electrically connected to each other or interconnected. By means of the plug-in module connector 10 it is possible to connect the respective poles 16 and 18 of the battery modules 12 and 14 in an especially time-saving and simple manner. For this purpose, the plug-in module connector 10 must only be plugged onto the poles 16 and 18. Due to manufacturing tolerances, for example, it is possible that poles 16 and 18 are not always arranged at the same relative position to each other. Therefore, the plug-in module connector 10 is designed in such a way that it can realize tolerance compensation in all three spatial directions, in longitudinal direction x, transverse direction y and in vertical direction z of the plug-in module connector 10.

The plug-in module connector 10 comprises a flexible busbar 20 for electrically conductive connection of the poles 16 and 18 of the battery modules 12 and 14. The busbar 20 can provide tolerance compensation with respect to poles 16 and 18 in the transverse direction y of module connector 10. The flexible busbar 20 can, for example be made of several copper sheets or copper foils layered on top of each other, which are not shown in detail here. The individual copper sheets or copper foils can, for example, have a thickness of 0.2 millimeters. The respective longitudinal ends 22 serving as connection ends can be converted into solid connecting pieces, for example by pressure welding. In other words, the individual sheets or foils, which are layered on top of each other, can be pressure-welded in the area of the respective longitudinal ends, thus forming solid connection areas.

The plug-in module connector 10 also includes two retaining clamps 24, which are U-shaped as in the case shown here. The retaining clamps 24 are used to enclose the busbar 20 and one of the respective poles 16 and 18 of the battery modules 12 and 14. The retaining clamps 24 allow tolerance compensation of the plug-in module connector 10 with respect to the relative positioning of the poles 16 and 18 in the longitudinal direction x and in the vertical direction z of the module connector 10. The retaining clamps 24 serving as retaining springs can be made of spring steel, for example, so that the retaining clamps 24 can exert a sufficiently high contact pressure in the transverse direction y on the busbar 20 and the poles 16 and 18. The flexible busbar 20 and the poles 16 and 18 are pressed together over their entire surface by the retaining clamps 24, which serve as retaining clips.

The plug-in module connector 10 also includes an insulation housing 26, in which the retaining clamps 24, which are attached to the busbar 20, can be accommodated. The insulation housing 26 can be an injection-molded part, so that it can be produced in large quantities and at a particularly low cost. The insulation housing 26 includes respective openings for the insertion of a tool, not shown here, which can be used to expand the retaining clamps 24.

For the electrically conductive connection of the two battery modules 12 and 14, the plug-in module connector 10, shown here in exploded view, is first pre-assembled. For this purpose, the retaining clamps 24 and the busbar 20 are arranged inside the insulation housing 26. The retaining clamps 24 in the insulation housing 26 may, for example, be first arranged, after which the busbar 20 is pushed into the retaining clamps 24. Alternatively, it is also possible, for example, to first push the retaining clamps 24 onto the busbar 20 and then to arrange this assembly inside the insulation housing 26.

The pre-assembled module connector 10 is then plugged onto the respective poles 16 and 18 for electrically conductive connection of the battery modules 12 and 14. Before the fitting operation, the module connector can be inserted through the openings 28 to expand the two retaining clamps 24. As a result, the poles 16 and 18 can be pushed more or less without force or at least without increased effort into the holding clamps 24 and thus brought into contact with the busbar 20.

Figure 2:
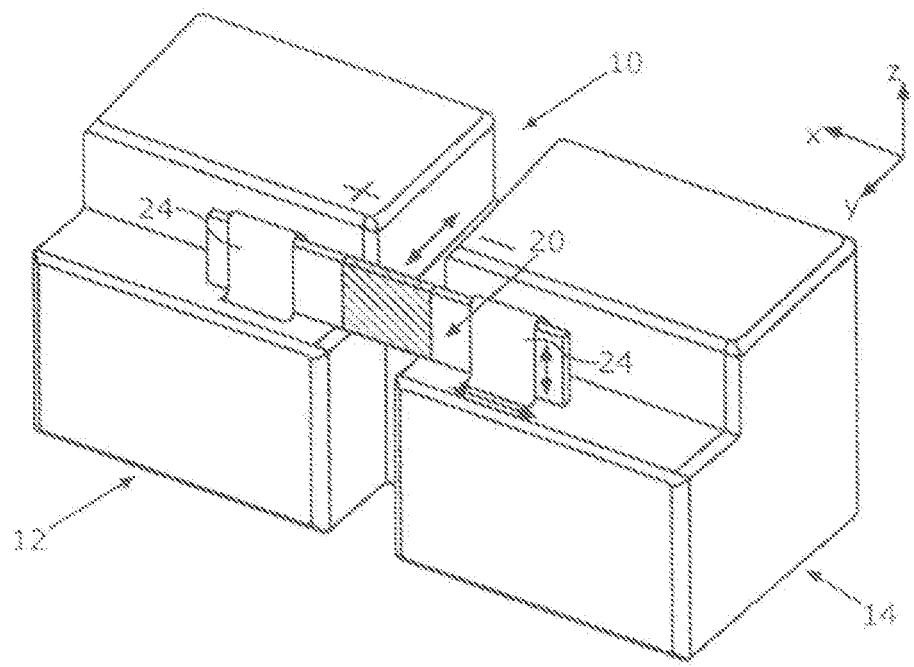
FIG. 2 depicts a perspective view of the two battery modules, after the respective poles of the battery modules have been connected to each other by means of the plug-in module connector, without an insulation housing of the plug-in module connector being shown.

In FIG. 2, the two battery modules 12 and 14 are shown in their connected state. For the plug-in module connector 10, the insulation housing 26 was omitted in the present illustration. In the plane formed by the longitudinal direction x and the vertical direction z, there is full contact between the busbar 20 and the poles 16 and 18, so that tolerance compensation is created in the longitudinal direction x when the plug-in module connector 10 is plugged in.

The busbar 20 and the poles 16 and 18 (not visible here) are pressed together over their entire surface by the retaining clamps 24 which serve as retaining springs. When the U-shaped retaining clamps 24 are pushed on, tolerance compensation in the vertical direction z of the plug-in module connector 10 is made possible. The flexible busbar 20 also enables tolerance compensation in the transverse direction y, as the busbar 20 can bend much more easily and further in the transverse direction y than in the other spatial directions.

Figure 3:
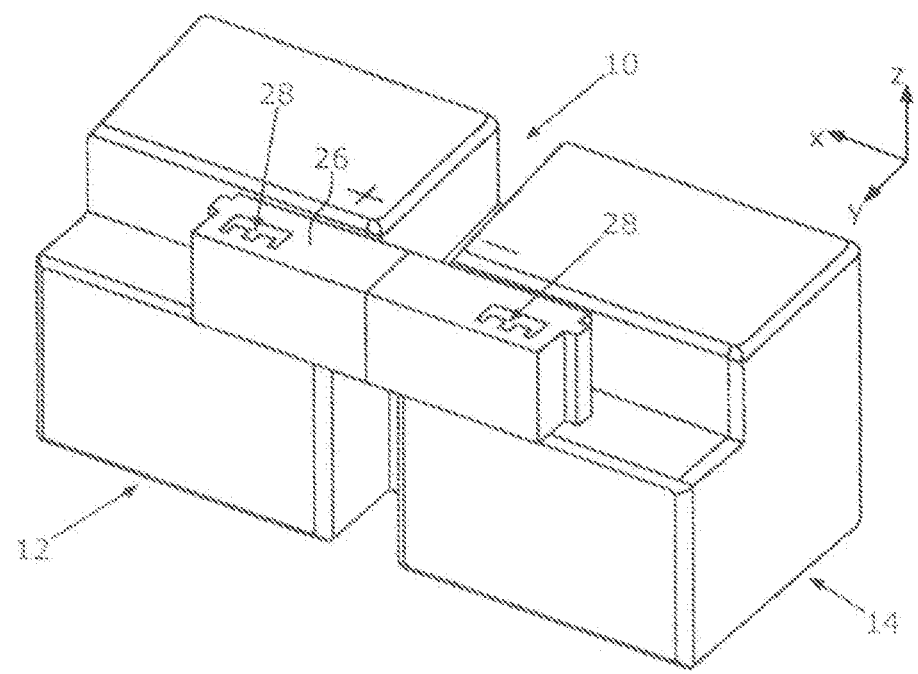
FIG. 3 depicts another perspective view of the interconnected battery modules, where the insulation housing of the plug-in module connector is displayed.

In FIG. 3 the connected battery modules 12 and 14 are shown in a further perspective view, whereby the insulation housing 26 of the plug-in module connector 10 is shown in this representation. The insulation housing 26 itself can preferably also accommodate movements of the flexible busbar 20 in the transverse direction y, which are required in the course of a tolerance adjustment. By contacting the poles 16 and 18 of the battery modules 12 and 14 by means of the clamps 24 and the flexible busbar 20, a tolerance adjustment in all three room directions x, y, z is achieved. The assembly times for batteries, which are composed of the individual battery modules 12 and 14, can be significantly shortened by means of the plug-in module connector 10. In addition, tolerances of several millimeters on the poles serving as module connections 16 and 18 can be offset by means of the plug-in module connector 10.

Figure 4:
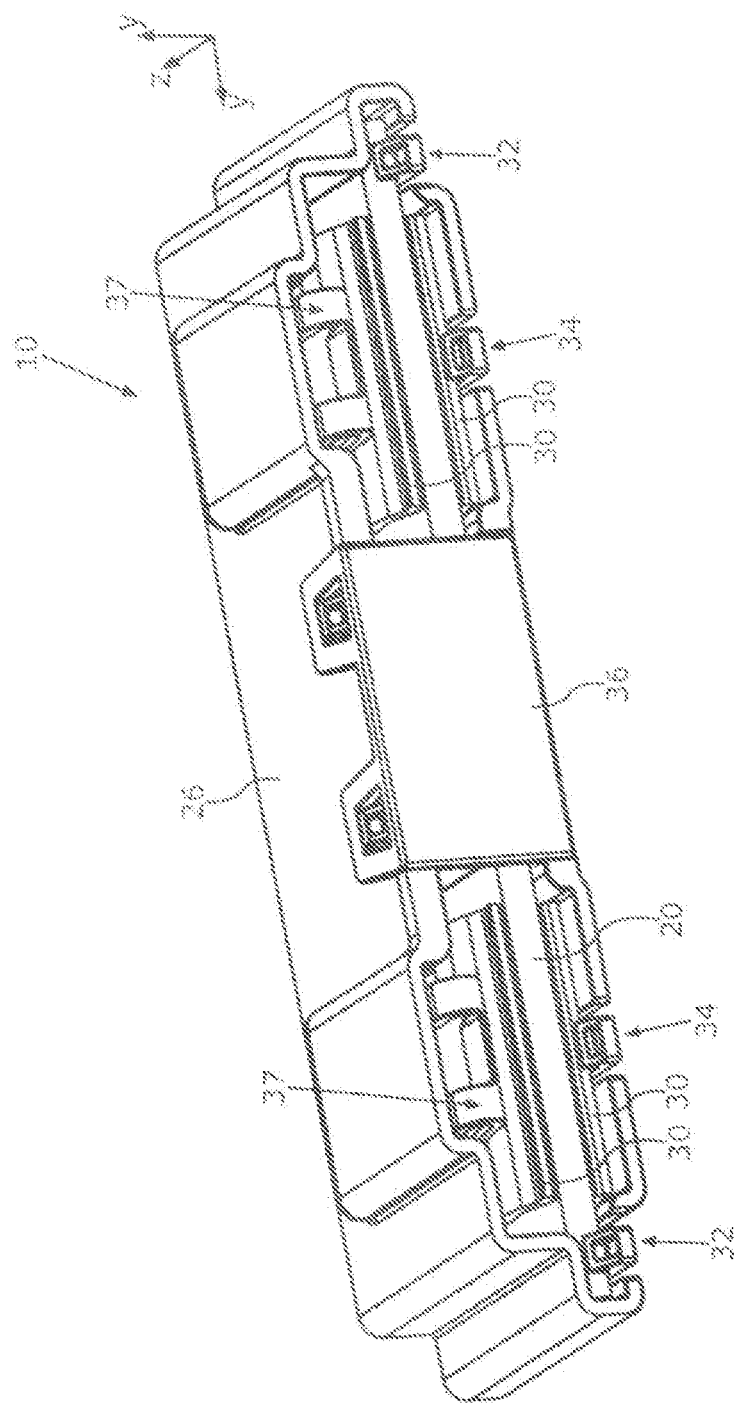
FIG. 4 depicts a perspective view of the pre-assembled pluggable module connector from an angle at the bottom.

In FIG. 4 the mounted plug-in module connector 10 is shown in a perspective view at an angle from below. As depicted though not in detail, individual wings 30 of clamps 24 may be identified. The electric busbar 20 is included between the wings 30 of the clamps 24. The insulation housing 26 has resting elements 32 for forming a resting connection with the busbar 20. In addition, the insulation housing 26 still has latching elements 34 for forming a resting connection with the respective clamps 24 and more precisely with one of the wings 30 of the clamps 24. In addition, the insulation housing 26 also includes a lug 36, which can be folded and gripped. This lug 36 serves as additional protection for the electrical busbar 20. Thus, in the upright direction z of the plug-in module connector 10, the busbar 20 and the clamps 24 are reliably held or secured by latching elements 32 and 34. Each spring element 37, which may or may not be part of the clamps 24, ensures a fixation of the busbar 20 and the clamps 24 in a transverse direction y to the plug-in module connector 10.

Figure 5:
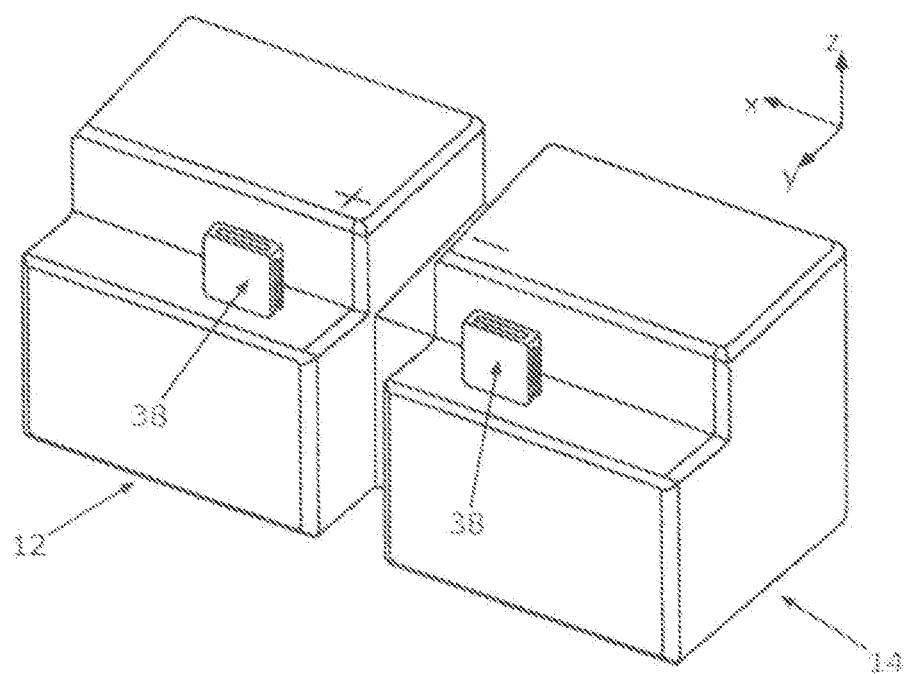
FIG. 5 depicts a perspective view of the two battery modules which are not yet electrically and conductively connected to each other, whereby the respective unrecognizable poles of the battery modules are surrounded by contact protection caps.

In FIG. 5 the two battery modules 12 and 14 are shown before being in an electrically conductive connection to one another. The poles 16 and 18 of the battery modules 12 and 14, which are not visible here, are surrounded by respective contact protection caps 38. The contact protection caps 38 may be made of polyamide, for example, and release the poles 16 and 18 when the plug-in module connector 10 is plugged on or mounted. The contact protection caps 38, for example, can be moved sideways, in a longitudinal direction x, or as well in a vertical direction z, to release the poles 16 and 18. The contact protection caps 38 can therefore be arranged on the respective battery modules 12,14 between a release position, which releases the poles 16 and 18 and a protective position surrounding the poles 16 and 18, as shown in the diagram below.

Figure 6:
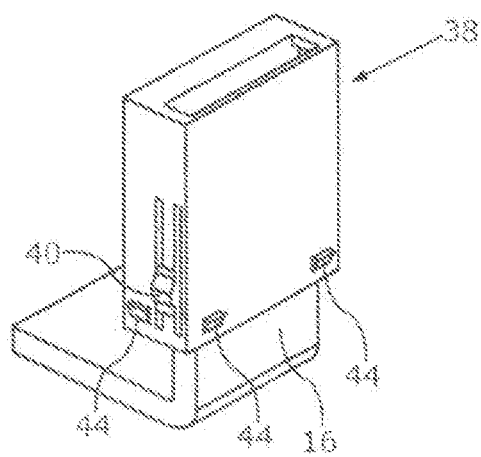
FIG. 6 depicts a perspective view of one contact protection cap while it surrounds one of the poles of the battery modules.

FIG. 6 depicts a perspective view of one of the contact protection caps 38 plugged over the pole 16. The contact protection caps 38 have a least one spring element 40, by means of which the contact protection caps 38 in their protective position—as shown in FIG. 5—arranged on a housing part 42 of the battery modules 12,14.

Figure 7:
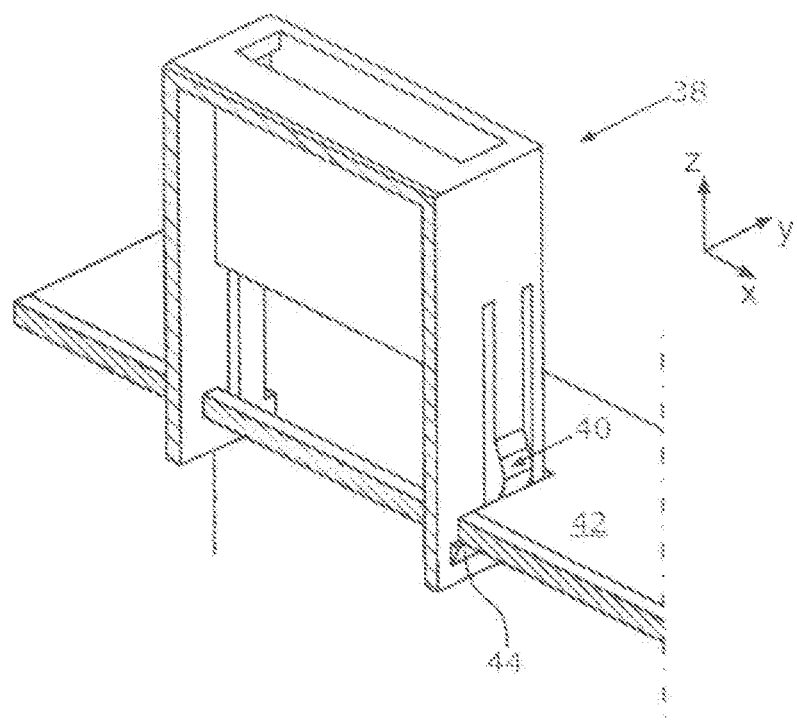
FIG. 7 depicts a rear view of the perspective of one of the contact protection caps, which is tangled to a part of the housing by one of the battery modules.

In FIG. 7 one of the two contact protection caps 38 is shown in a perspective rear view. In this illustration it is evident how the spring element 40 is tangled with a housing part 42 by one of the two battery modules 12 and 14, not described here. Each ramp-shaped projection 44 on the contact protection caps 38 are used for additional fixation on the housing part 42. The housing part 42 is mounted in the upright direction z between the spring element 40 and the ramp-shaped projections 44. As long as no corresponding force is exerted on spring elements 40, the respective contact shown, protects the respective poles 16 and 18.

When the plug-in module connector 10 is plugged into or out of the contact caps 38, the spring elements 40 are pressed inwards, and as a result the grip on the contact caps 38 is loosened. Thus, the contact protection caps 38 can slide downwards in the vertical direction z and the poles 16 and 18 can be released for contact with the plug-in module connector 10.

Figure 8:
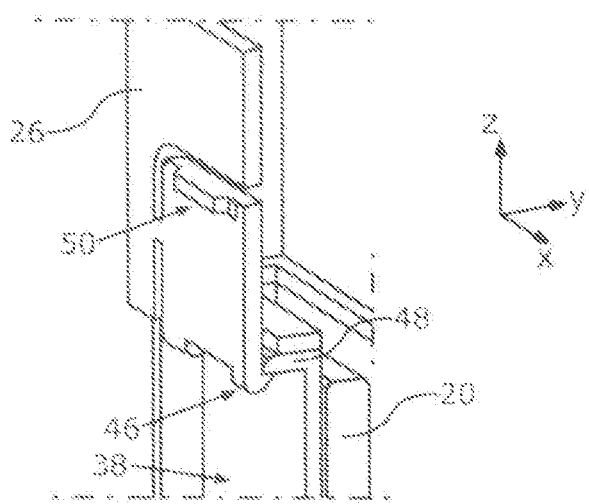
FIG. 8 depicts a further perspective rear view of one of the contact protection caps, while it is pulled into an upper end position by means of a driver formed on the insulation housing of the plug-in module connector.

In FIG. 8, a part of the insulation housing 26 of the plug-in module connector 10 and one of the contact protection caps 38 are shown in a partially cut perspective view. The insulation housing 26 on the plug-in module connector 10 each has a driver 46 per contact protection cap 38, by means of which the respective contact protection cap 38 can be moved from a lowered release to the protection position, if the module connector 10 after the plug-in onto the poles 16 and 18 is pulled off them again against a corresponding plug-on direction, i.e., in the case shown here, namely, it is moved upwards. When pushed on or plugged onto the module connector 10, the contact protection caps 38 are released and pressed down by overcoming a respective spring force of the spring elements 40. When the module connector 10 is removed, in a lower end position, the respective drivers 46 on the insulation housing 26 can engage onto a projection 48 of the contact protection caps 38 and pull the contact protection caps 38 back into their respective upper end position, i.e., into their protective position surrounding the poles 16,18. For each driver 46, an appropriate unlocking 50 is also provided on the insulation housing 26, so that the module connector 10 can be easily released again from the contact protection caps 38.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A plug-in module connector for making an electrical connection of at least two battery modules, the plug-in module connector comprising:
   a flexible busbar configured to electrically conductive connection of poles of the battery modules, wherein the busbar enables tolerance compensation with respect to the poles in a transverse direction of the module connector;

two retaining clamps arranged to encompass the busbar and one of the respective poles of the battery modules, whereby the retaining clamps include a tolerance adjustment with respect to the poles in a longitudinal direction and vertical direction of the module connector 10; and an insulation housing configured to accommodate the retaining clamps plugged onto the electric busbar.

2. The plug-in module connector according to claim 1, wherein the insulation housing has at least one opening for the insertion of a tool, by means of which the retaining clamps can be expanded.

3. The plug-in module connector according to claim 1, wherein the insulation housing has at least one latching element with the electric busbar.

4. The plug-in module connector according to claim 1, wherein the insulation housing has at least one latching element in each case for forming a latching connection with the respective retaining clamps.

5. The plug-in module connector according to claim 1, wherein the flexible busbar 20 comprises several metal sheets layered on top of each other.

6. The plug-in module connector according to claim 5, wherein the plates are pressure-welded at the respective longitudinal ends of the busbar and thereby form solid connection areas.

7. A connection system for making an electrical connection of at least two battery modules, the system comprising:

a plug-in module connector comprising flexible busbar configured to electrically conductive connection of poles of the battery modules, wherein the busbar 20 enables tolerance compensation with respect to the poles in a transverse direction of the module connector;

two retaining clamps arranged to encompass the busbar and one of the respective poles of the battery modules, whereby the retaining clamps include a tolerance adjustment with respect to the poles in a longitudinal direction and vertical direction of the module connector 10; and an insulation housing configured to accommodate the retaining clamps plugged onto the electric busbar; and at least two contact protection caps for respective poles of the battery modules.

8. The connection system according to claim 7, where the contact protection caps 38 are arranged in to be movable on the battery modules between a release position releasing the poles and a protection position surrounding the poles.

9. The connection system according to claim 8, wherein the contact protection caps each have at least one spring element by means of which the contact protection caps latch in their protective position on a housing part of the battery modules.

10. The connection system according to claim 8, wherein the insulation housing of the plug-in module connector has a driver for each contact protection cap, by means of which the respective contact protection cap can be moved from the release position into the protection position when the module connector is pulled off the poles again against a plug-on direction after being plugged onto them.

11. A method for forming an electrical connection of at least two battery modules, the method comprising the steps of:

configuring a flexible busbar to form an electrical connection of poles of the battery modules, wherein the busbar enables tolerance compensation with respect to the poles in a transverse direction of the module connector;

a arranging two retaining clamps to encompass the busbar and one of the respective poles of the battery modules, whereby the retaining clamps include a tolerance adjustment with respect to the poles in a longitudinal direction and vertical direction of the module connector 10;

configuring an insulation housing to accommodate the retaining clamps plugged onto the electric busbar; and wherein the module connector is pre-assembled by arranging the retaining damps of the module connector, which are plugged onto the busbar of the module connector, in the insulation housing of the module connector, after which the pre-assembled module connector is plugged onto the respective poles of the battery modules for the electrically conductive connection to of the batter modules.

\* \* \* \* \*